US006257501B1

(12) United States Patent
Roach et al.

(10) Patent No.: US 6,257,501 B1

(45) Date of Patent: Jul. 10, 2001

(54) ELECTRIC FAN HAVING A CONCENTRIC FAN-MOUNTED MISTER

(75) Inventors: Kenneth Roach, Fort Lauderdale, FL (US); Don Lee; Cobol Shu, both of Taipei (TW)

(73) Assignee: Atico International USA, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/654,650

(22) Filed: Sep. 5, 2000

(51) Int. Cl.$^{7}$ .............................. B05B 15/00; B05B 17/00

(52) U.S. Cl. ........................ 239/289; 239/214; 239/225.1; 239/280; 239/280.5; 239/DIG. 23; 261/30; 261/116

(58) Field of Search ................................ 239/214, 225.1, 239/280, 280.5, 289, DIG. 23; 261/30, 116, DIG. 3

(56) References Cited

U.S. PATENT DOCUMENTS 1,066,851 * 7/1913 Siefert ................................ 261/30 X
1,586,997 * 6/1926 Hull ................................ 239/214 X
2,079,117 * 5/1937 Hays ..................................... 261/30
2,238,120 * 4/1941 Launder ........................ 239/280.5 X
4,493,457 * 1/1985 Dilworth et al. ...................... 239/25
5,062,487 * 11/1991 Siria et al. ............................ 169/91
5,934,349 * 8/1999 Faller .................................. 160/127
6,086,053 * 7/2000 Natschke et al. ...................... 261/30

* cited by examiner

*Primary Examiner*—David A. Scherbel
*Assistant Examiner*—Robin O. Evans
(74) *Attorney, Agent, or Firm*—Cobrin & Gittes

(57) ABSTRACT

A mister and an electric fan combination is mounted upon a vertical stand. The mister has a housing arranged to define a curvature that is concentric with a rotational center of rotary fan blades and with the central back of the fan. The housing is attached to the fan guard grill. The mister has a flexible hose extending from a junction with the housing to a location distal from the housing to convey pressurized fluid from a source. The electric fan is pivotally connected on diametrically opposite sides to a connection structure, which is raised by a pole from a base structure.

1 Claim, 4 Drawing Sheets

F/G. 1

ELECTRIC FAN HAVING A CONCENTRIC FAN-MOUNTED MISTER

FIELD OF THE INVENTION

This invention pertains to the field of electric fans and more specifically to electric fans having a mister for the propagation of a fluid mist cloud.

BACKGROUND OF THE INVENTION

Electric fans have long been used to circulate air currents so as to produce a cooling effect for those sitting in front of the fan. Recently, misters capable of projecting water through a nozzle have been used in combination with electric fans in order to further enhance the cooling effect. These misters are often located close to the electric fan so that when water exist the mister nozzle, it is propelled forward by the air currents created by the fan blades, thereby creating a water mist cloud. Such fan/mister combinations have proven especially popular at theme parks, where patrons, who are hot and perspiring after standing in queues for hours, enjoy the ability to cool off by having a mist of water sprayed upon them.

One example of such a fan/mister combination can be found in U.S. Pat. No. 6,086,053 to Natschke et al, which discloses a conical mister containing a plurality of nozzles affixed to the central hub of an electric fan. Unfortunately, the prior art is limited. The propagation area of the mist cloud (i.e. the size of the mist cloud) is functionally proportionate to the distance between the water nozzles of the mister. As such, misters which contain nozzles relatively close to one another are capable of producing only small mist clouds. A larger mist cloud propagation area could be obtained by increasing the distance between the water nozzles. But, as the prior art teaches, the water nozzles are contained within a conical structure affixed to the central hub of the electric fan. Therefore, increasing the distance between the water nozzles necessarily increases the size of the conical section, which, in effect, would block the flow of air currents produced by the fan blades, thereby leaving the invention without the ability to generate a mist at all.

It would be beneficial then to have an electric fan/mister combination capable of producing larger mist clouds without blocking the flow of air currents produced by the fan blades.

SUMMARY OF THE INVENTION

The present invention is a mister for use with an electric fan to achieve the propagation of a fluid mist cloud.

According one aspect of the invention, the mister is used in combination with an electric fan that has a central hub, rotary fan blades, and a blade guard grill and includes a housing that is arranged to define a curvature, the housing being attached to the blade guard grill to be concentric with the central hub, at least one nozzle supported by the housing, and a flexible hose extending at least from a junction on the housing to a location distal from the housing to convey fluid from a source to the nozzle.

According to another aspect of the invention, the housing is tubular to define a channel, and the nozzle and flexible hose are in fluid communication with the channel.

The electric fan is being mounted upon a vertical stand. The vertical stand includes a base structure, a connection structure that includes a curved portion with two curved arms that terminate at free ends that are pivotally mounted diametrically opposite each other on a circumferential edge of the electric fan, and an elongated pole between the base structure and the connection structure that raises the electric fan to an elevation higher than the base structure.

DETAILED DESCRIPTION OF THE INVENTION

The present invention is a mister for use with an electric fan to achieve the propagation of a fluid mist cloud.

Figure 1:
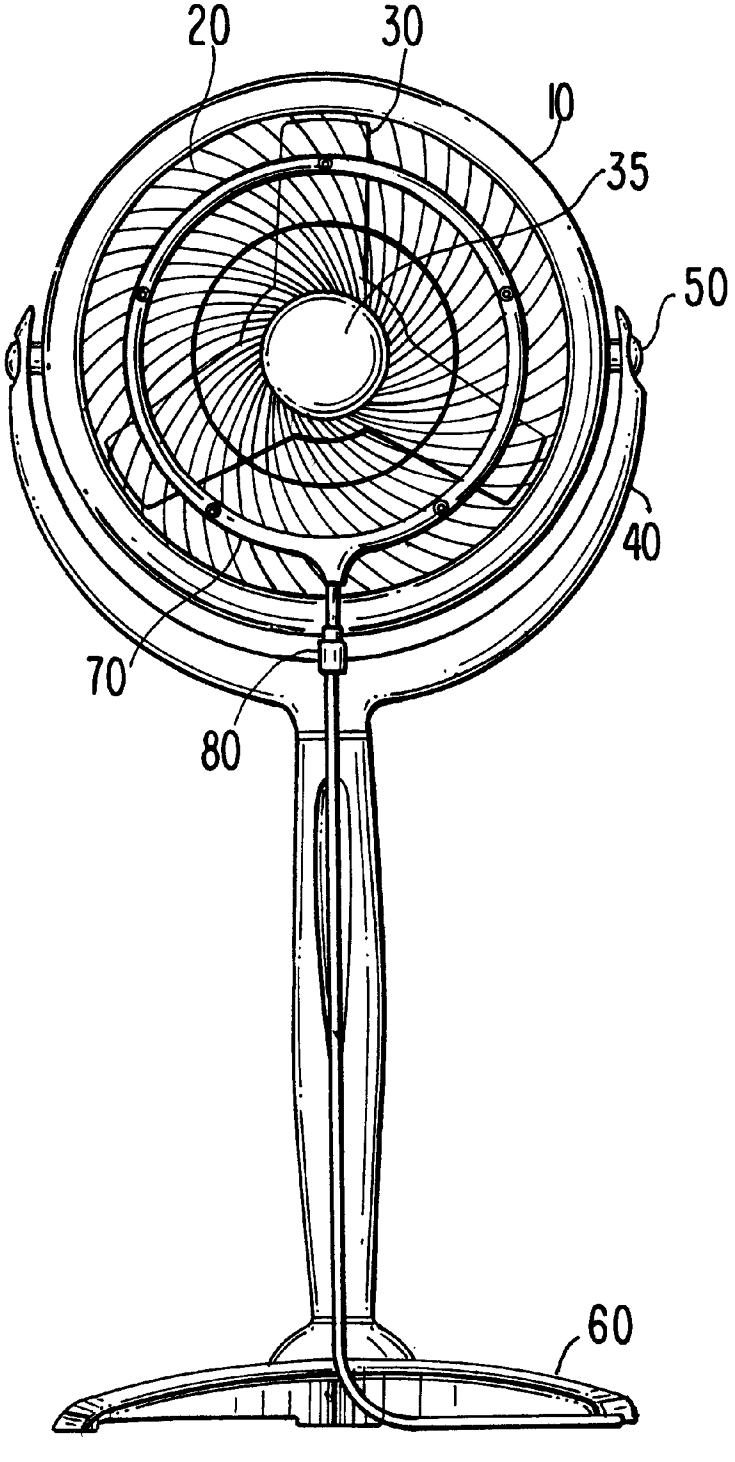
FIG. 1 is a front view of an electric fan having a concentric mister manifold affixed to the fan guard grill.

FIG. 1 illustrates one embodiment of the present invention. The electric fan may be composed of an electric fan body 10. The electric fan body may be of any shape appropriate for enclosing fan blades 30. As illustrated, the electric fan body is of a circular shape, though it is noted that the electric fan body 10 may also be rectangular, square or some other shape. The electric fan body 10 encloses a set of fan blades 30 within fan guard grills 20. Fan guard grills 20 may be used on both sides of the fan body 10 so as to enclose the entire interior of the fan body 10 thereby preventing the accidental insertion of an object, such as a finger, by making the entire interior inaccessible.

The fan blades 30 may be capable of rotating about an axis perpendicular to the blades in either a clockwise or counter-clockwise direction, thereby generating air currents. Although three fan blades are shown, more or less fan blades may be used. The direction of rotation may be manually selected by the user. The speed of the fan blade rotation may also be manually selected by the user. Different speed options may be provided. The fan blades 30 are powered by an electric motor 35, which may be located at the central hub of the electric fan body 10.

The electric fan body 10 may be free standing, or it may be contained within a stand 40. It may be attached to a stand 40 at a hinge 50 which allows the electric fan body 10 to swing forward or backward about an axis parallel to the floor. The stand 40 may be connected to a base 60 so that the structure in its entirety may be securely placed on a floor. The stand 40 includes a connection structure that has two curved arms that are pivotally connected at diametrically opposite locations on the circumferential edge of the electric fan as shown in FIG. 1. A pole raises the arms to an elevation higher than that of the base 60.

The electric fan body 10 may also have a concentric mister manifold 70 affixed to the fan guard grill 20 on the front side of the electric fan body 10. The mister manifold 70 may be affixed to the fan guard grill 20 at points equidistantly spaced away from the center hub of the fan. The mister manifold 70 may be affixed to the fan guard grill 20 through the use of conventional bolts or screws, or it may be affixed to the fan guard grill 20 by clips which can clasp the mister manifold 70 to the fan guard grill 20. The mister manifold 70 may also be attached by mounting clasps 200, illustrated in FIG. 4. The mounting clasps may have an attaching end 210 for attaching to the fan guard grill 20 and a receiving end 220 for receiving the mister manifold 70. The mounting clasp may be made wholly of one material, such as plastic, or it may be made of different materials, such as metal and plastic. For example, the receiving end 220 made be made of a flexible plastic while the attaching end 210 may be made of metal.

Figure 4:
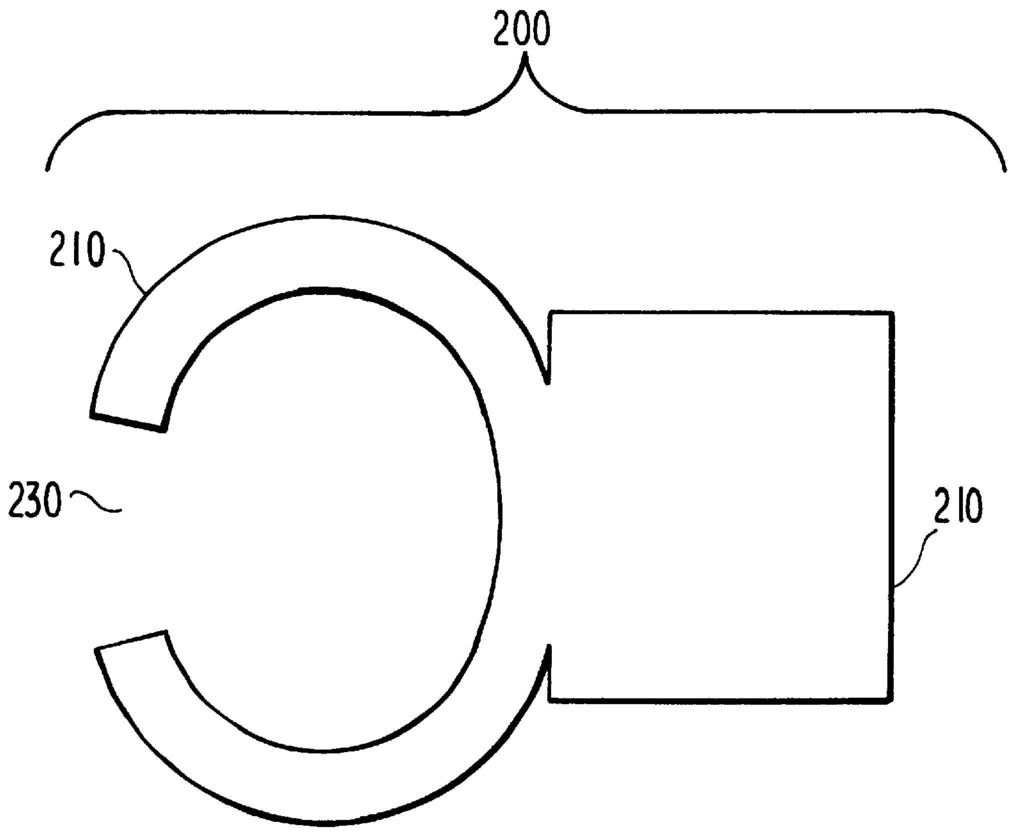
FIG. 4 is a side view of a mounting clasp.

The attaching end 210 may be configured so that it may be affixed to the fan guard grill 20 using conventional bolts or screws as in FIG. 4. For example, the mounting clasp may be pressed flush against the fan guard grill 20, and a bolt may be inserted through an opening in the grill into the attaching end 210. The attaching end 210 may also be molded into the fan guard grill 20 itself.

The mister manifold 70 may be affixed to the mounting clasp 200 by pressing the manifold 70 into the receiving end 220 through the aperture 230. If the aperture 230 is smaller than the thickness of the mister manifold 70, the receiving ends 220 should be made of some flexible material which would allow the aperture 230 to open slightly as the mister manifold 70 is inserted through. Once the mister manifold 70 is inserted through the aperture 230, the receiving ends 220 may snap down upon the mister manifold 70, thereby holding the manifold in a snug position which allows very little movement.

The mister manifold 70 may be a hollow body so that fluid may travel inside the mister manifold 70 freely, as it would in a fluid channel. The concentric mister manifold 70 may have a nozzle (not shown) in communication with the hollow fluid channel. Fluid, such as water, may travel through the hollow body of the mister manifold 70 and be projected out a nozzle. Once projected in front of the electric fan body 10, the fluid would be propelled forward by the air currents produced by the rotating fan blades 30, thereby creating a fluid mist cloud. The mister manifold 70 may contain many nozzles. If more than one nozzle is utilized, the nozzles may be evenly spaced throughout the mister manifold 70 so that the distance between each nozzle is equal. The nozzles may further contain a filter screen for screening out particles that may be found within the water supply of the mister manifold 70.

Fluid may be poured into the mister manifold 70 by the user. The mister manifold 70 may also be connected to a flexible hose 80 connected to a source of fluid. The source of fluid may be pressurized so that fluid will rush into hollow channel of the mister manifold 70 from its source through the flexible hose 80. Since the density of the mist cloud is dependent on the amount of fluid projected by the mister manifold, it would be beneficial if a user could regulate the amount of water flowing through the flexible hose 80 into the mister manifold 70. Therefore, the flexible hose 80 may have a valve so that a user may manually control the amount of fluid flowing into the mister manifold 70 at any time. In the alternative, the flexible hose 80 may be connected to an already existing valve, such as a pressurized water valve usually located in gardens and such.

Figure 2:
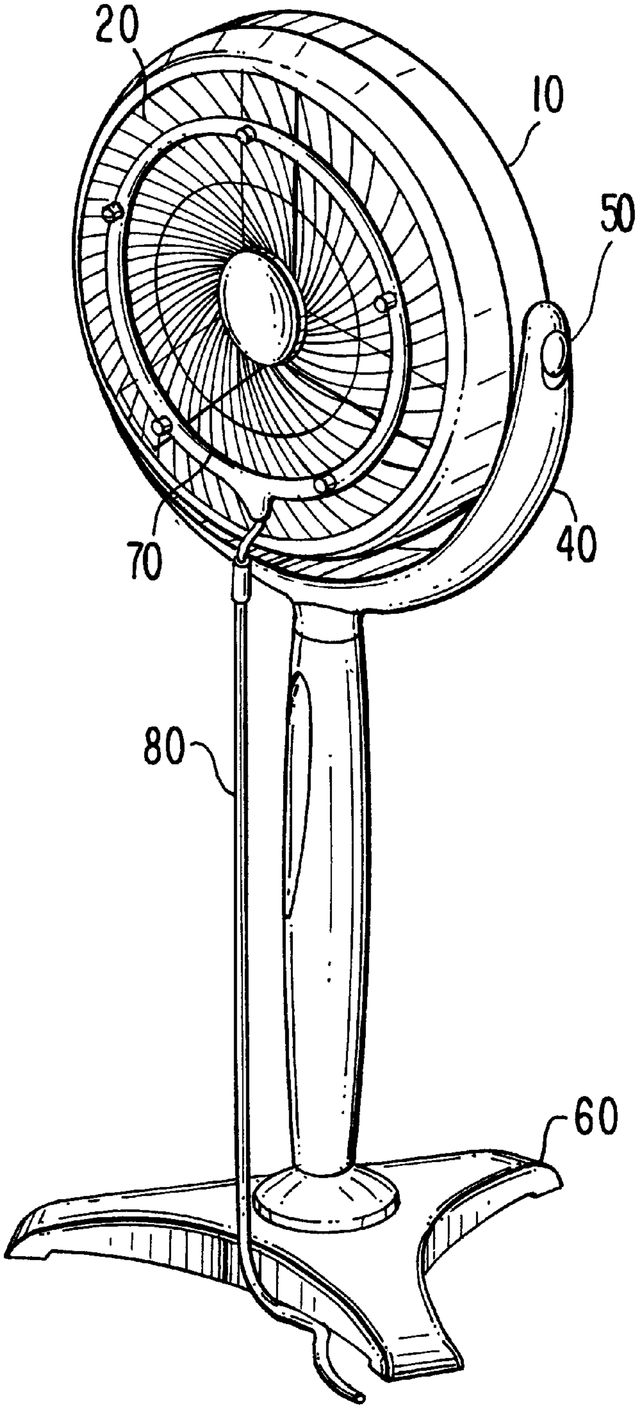
FIG. 2 is a side view of an electric fan having a concentric mister manifold affixed to the fan guard grill.
Figure 3:
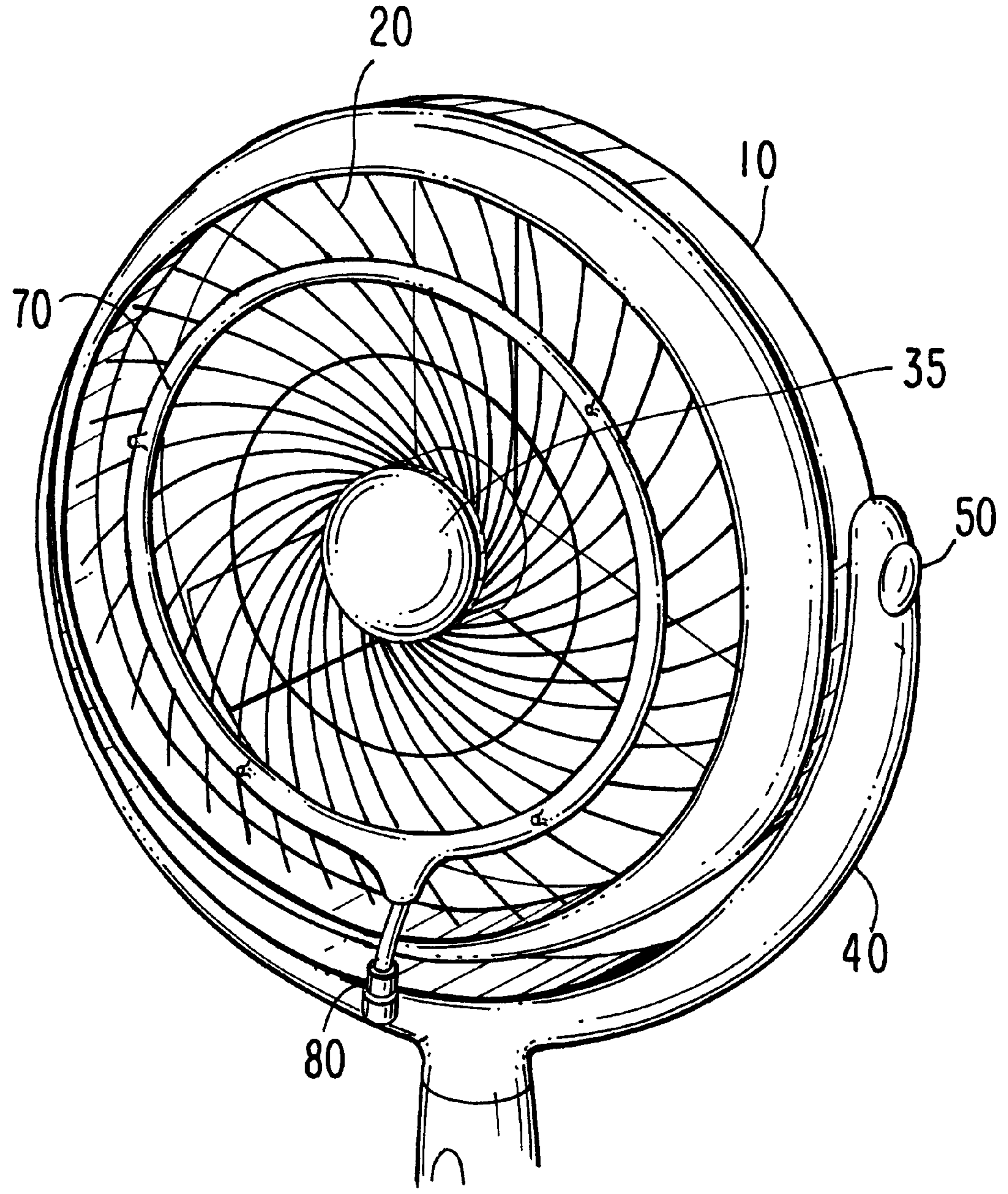
FIG. 3 is a front view of an electric fan body having a concentric mister manifold affixed to the fan guard grill.

The flexible hose 80 may be attached to a single point on the mister manifold 70, or it may be attached to multiple points on the mister manifold 70. For example, it may be attached at each nozzle on the mister manifold 70. The body of the flexible hose 80 may be allowed to hang freely from the point of attachment as illustrated in FIG. 2. In the alternative, the body of the flexible hose 80 may itself be affixed to the mister manifold 70, thereby conforming to the curved, concentric shape of the mister manifold 70. The flexible hose 80 may be affixed to the manifold 70 through the use of an adhesive or through some other method.

Therefore, by affixing the mister manifold 70 at points equidistantly spaced away from the center hub of the fan, the present invention provides a way of increasing the distance between mister nozzles without subsequently blocking the passage of air currents created by a fan blade. It will be noted by those skilled in the art that the propagation area of the mist cloud can be decreased or increased by decreasing or increasing the diameter of the concentric mister manifold 70.

The following claims are intended to cover all of the generic and specific features of the invention described herein, and all statements of the scope of the invention which, as a matter of language, might be said to fall there between.

Having described the invention what is claimed is:

1. A combination that comprises a mister and an electric fan, the electric fan having a central hub, rotary fan blades, and a blade guard grill extending distally from a central hub to an outer boundary;

the mister including a manifold having a configuration of a complete circular ring and that is concentric with a rotational center of the rotary fan blades and with the central hub, the manifold being attached to the blade guard grill at a location closer to an outer boundary of the electric fan than to the central hub, the mister also including a flexible hose extending at least from a junction with the manifold to a location distal from the manifold to convey pressurized water from a source to the manifold, the junction being spaced from the central hub, the electric fan being mounted upon a vertical stand, the vertical stand including a base structure, a connection structure that includes a curved portion with two curved arms that terminate at free ends that are pivotally mounted diametrically opposite each other on a circumferential edge of the electric fan, and an elongated pole between the base structure and the connection structure that raises the electric fan to an elevation higher than the base structure.

* * * * *